(12) United States Patent
Thomas et al.

(10) Patent No.: US 11,481,209 B2
(45) Date of Patent: *Oct. 25, 2022

(54) INTELLIGENT SOFTWARE AGENT TO FACILITATE SOFTWARE DEVELOPMENT AND OPERATIONS

(71) Applicant: Hartford Fire Insurance Company, Hartford, CT (US)

(72) Inventors: Renoi Thomas, Thornwood, NY (US); Satish Venugopal, Chennai (IN); Sachin Mittal, Cumming, GA (US); Sandeep Kumar Yaramchitti, Manchester, CT (US)

(73) Assignee: HARTFORD FIRE INSURANCE COMPANY, Hartford, CT (US)

(*) Notice: Subject to any disclaimer, the term of this patent is extended or adjusted under 35 U.S.C. 154(b) by 0 days.

This patent is subject to a terminal disclaimer.

(21) Appl. No.: 17/154,184

(22) Filed: Jan. 21, 2021

(65) Prior Publication Data

US 2021/0141635 A1     May 13, 2021

Related U.S. Application Data

(63) Continuation of application No. 16/450,104, filed on Jun. 24, 2019, now Pat. No. 10,963,242.

(51) Int. Cl.
*G06F 8/70* (2018.01)
*G06N 20/00* (2019.01)
(Continued)

(52) U.S. Cl.
CPC .................. *G06F 8/70* (2013.01); *G06F 9/54* (2013.01); *G06F 11/3466* (2013.01);
(Continued)

(58) Field of Classification Search
CPC .......... G06F 8/70; G06F 9/54; G06F 11/3466; G06K 9/6267; G06N 5/04; G06N 20/00
See application file for complete search history.

(56) References Cited

U.S. PATENT DOCUMENTS 10,534,701 B1 * 1/2020 Pande ................. G06F 11/3688
10,565,093 B1 * 2/2020 Herrin ....................... G06F 8/77
(Continued)

OTHER PUBLICATIONS

Ansong Ni et al., "Poster: ACONA: Active Online Model Adaptation for Predicting Continuous Integration Build Failures," 2018 [retrieved on Jun. 17, 2022], IEEE/ACM 40th International Conference on Software Engineering:Companion (ICSE—Companion), pp. 366-367, downloaded from <url>:https://ieeexplore.ieee.org (Year: 2018).*

*Primary Examiner* — Thuy Dao
*Assistant Examiner* — Stephen D Berman
(74) *Attorney, Agent, or Firm* — Buckley, Maschoff & Talwalkar LLC

(57) ABSTRACT

Some embodiments may facilitate software development and operations for an enterprise. A communication input port may receive information associated with a software continuous integration/deployment pipeline of the enterprise. An intelligent software agent platform, coupled to the communication input port, may listen for a trigger indication from the software continuous integration/deployment pipeline. Responsive to the trigger indication, the intelligent software agent platform may apply system configuration information and rule layer information to extract software log data and apply a machine learning model to the extracted software log data to generate a pipeline health check analysis report. The pipeline health check analysis report may include, for example, an automatically generated prediction associated with future operation of the software continuous integration/deployment pipeline. The intelligent software
(Continued)

agent platform may then facilitate transmission of the pipeline health check analysis report via a communication output port and a distributed communication network.

19 Claims, 14 Drawing Sheets

(51) Int. Cl.
  *G06F 9/54* (2006.01)
  *G06K 9/62* (2022.01)
  *G06F 11/34* (2006.01)
  *G06N 5/04* (2006.01)
(52) U.S. Cl.
  CPC ............ *G06K 9/6267* (2013.01); *G06N 5/04* (2013.01); *G06N 20/00* (2019.01)

(56) References Cited

U.S. PATENT DOCUMENTS

| | | | | |
|---|---|---|---|---|
| 2012/0266142 | A1* | 10/2012 | Bokhari | G06F 11/3688 717/127 |
| 2014/0033186 | A1* | 1/2014 | Bonanno | G06F 8/71 717/156 |
| 2016/0034270 | A1* | 2/2016 | Swierc | G06F 11/3668 717/126 |
| 2017/0003948 | A1* | 1/2017 | Iyer | H04L 41/5054 |
| 2017/0357485 | A1* | 12/2017 | Rees | G06F 8/71 |
| 2019/0065357 | A1* | 2/2019 | Brafman | G06F 11/3664 |
| 2019/0155722 | A1* | 5/2019 | Gupta | G06F 11/302 |
| 2019/0317754 | A1* | 10/2019 | Mosquera | G06F 8/77 |
| 2020/0065220 | A1* | 2/2020 | Sobran | G06F 11/3664 |
| 2020/0117587 | A1* | 4/2020 | Salim | G06F 11/3664 |
| 2020/0218622 | A1* | 7/2020 | Zhang | G06F 8/658 |

* cited by examiner

| S.NO | DESCRIPTION | STATUS | EXECUTION DATE | EXECUTION TIME |
|---|---|---|---|---|
| 1 | Start Test OneView_AARP_Home_QA | | 11/28/2018 | 22:06:01 |
| 2 | Start Global Iteration 1 | | 11/28/2018 | 22:06:04 |
| 3 | Start Action OneView Home_QA | | 11/28/2018 | 22:06:04 |
| 4 | Continue WaitProperty "visible" "True" 60000 Ok: Object's physical description: micclasscommentproperty = //DIV[@id="popups"]/DIV[1]/DIV[1]/FORM[1]/DIV[3]/DIV[1]/DIV[1]/DIV[1]/BU TTON[1] Visible = -1 Value = formID=57,objectID=1,eventType=4 Html Tag = BUTTON Type = button Name = Ok Html Id = f57_btnOK DHTML Class = text-in-center GTTextButton GTBW confirm-button confirm-57 | Passed | 11/28/2018 | 22:09:45 |
| 5 | Run Error: Cannot identify the object "OK" (of class WebButton). Verify that this object's properties match an object currently displayed in your application. Function file: {ALM/Resources} Resources\Automation\QA\View_utfq1\View_Home\1View_Home_Func_lib.qfl Line (141): "Browser("Select Profile").Page("Select Profile_2").WebButton("Ok").Click" | Passed | 11/28/2018 | 22:11:34 |
| 6 | New Quote WaitProperty "visible" "True" 60000 | Failed | 11/28/2018 | 22:11:35 |
| 7 | not loaded properly | Failed | 11/28/2018 | 22:12:20 |
| 8 | | | | |
| 9 | End Action OneView_Home_QA | | 11/28/2018 | 22:12:37 |
| 10 | End Global Iteration 1 | | 11/28/2018 | 22:12:37 |
| 11 | End Test OneView_AARP_Home_QA | | 11/28/2018 | 22:12:37 |
| 12 | Ok:Cannot identify the object "Ok" (of class WebButton) Verify that this object's prop Failed | | 11/28/2018 | 22:11:34 |

FIG. 6

INTELLIGENT SOFTWARE AGENT TO FACILITATE SOFTWARE DEVELOPMENT AND OPERATIONS

CROSS-REFERENCE TO RELATED APPLICATIONS

The present application is a continuation of U.S. patent application Ser. No. 16/450,104 entitled "INTELLIGENT SOFTWARE AGENT TO FACILITATE SOFTWARE DEVELOPMENT AND OPERATIONS" and filed on Jun. 24, 2019. The entire content of that application is incorporated herein by reference.

BACKGROUND

An enterprise may develop and deploy software applications. For example, a business might write software applications (and periodic upgrades to those applications) to handle internal workflows, interactions with customers, etc. As part of the software development process, the enterprise may implement quality assurance processes to reduce the likelihood of errors and improve the stability of the software application. For example, the enterprise might manually review software error logs to monitor the quality of software development. Recently, enterprises have begun to combine software development practices and information technology operations to shorten the system development lifecycle while still delivering features, fixes, and updates in accordance with business objectives. This trend, which includes Continuous Integration ("CI") and Continuous Deployment ("CD") processes which introduce a fast pace of software builds and automated test executions. Manually implementing quality assurance in such an environment can be a time consuming and error-prone task (e.g., a team of experts may face a huge job of reviewing software logs to determine the root causes of an error).

It would be desirable to provide systems and methods to automatically and efficiently implement quality assurance in a software development environment.

SUMMARY OF THE INVENTION

According to some embodiments, a system may facilitate software development and operations for an enterprise. A communication input port may receive information associated with a software continuous integration/deployment pipeline of the enterprise. An intelligent software agent platform, coupled to the communication input port, may listen for a trigger indication from the software continuous integration/deployment pipeline. Responsive to the trigger indication, the intelligent software agent platform may apply system configuration and rule layer information to extract software log data and apply a machine learning model to the extracted software log data to generate a pipeline health check analysis report. The pipeline health check analysis report may include, for example, an automatically generated prediction associated with future operation of the software continuous integration/deployment pipeline. The intelligent software agent platform may then facilitate transmission of the pipeline health check analysis report via a communication output port and a distributed communication network.

Some embodiments comprise: means for listening, by intelligent software agent platform, to information from a communication input port associated with a software continuous integration/deployment pipeline of an enterprise, wherein the intelligent agent is listening for a trigger indication from the software continuous integration/deployment pipeline; responsive to the trigger indication, means for applying system configuration and rule layer information to extract software log data; means for applying a machine learning model to the extracted software log data to generate a pipeline health check analysis report, wherein the pipeline health check analysis report includes an automatically generated prediction associated with future operation of the software continuous integration/deployment pipeline; and means for transmitting, via a communication output port coupled to the intelligent software agent platform, the pipeline health check analysis report via a distributed communication network.

In some embodiments, a communication device associated with an intelligent software agent platform exchanges information with remote devices in connection with an interactive graphical user interface. The information may be exchanged, for example, via public and/or proprietary communication networks.

A technical effect of some embodiments of the invention is an improved and computerized way to automatically and efficiently implement quality assurance in a software development environment. With these and other advantages and features that will become hereinafter apparent, a more complete understanding of the nature of the invention can be obtained by referring to the following detailed description and to the drawings appended hereto.

BRIEF DESCRIPTION OF THE DRAWINGS

FIG. 6 illustrates health check details according to some embodiments.

DETAILED DESCRIPTION

Figure 1:
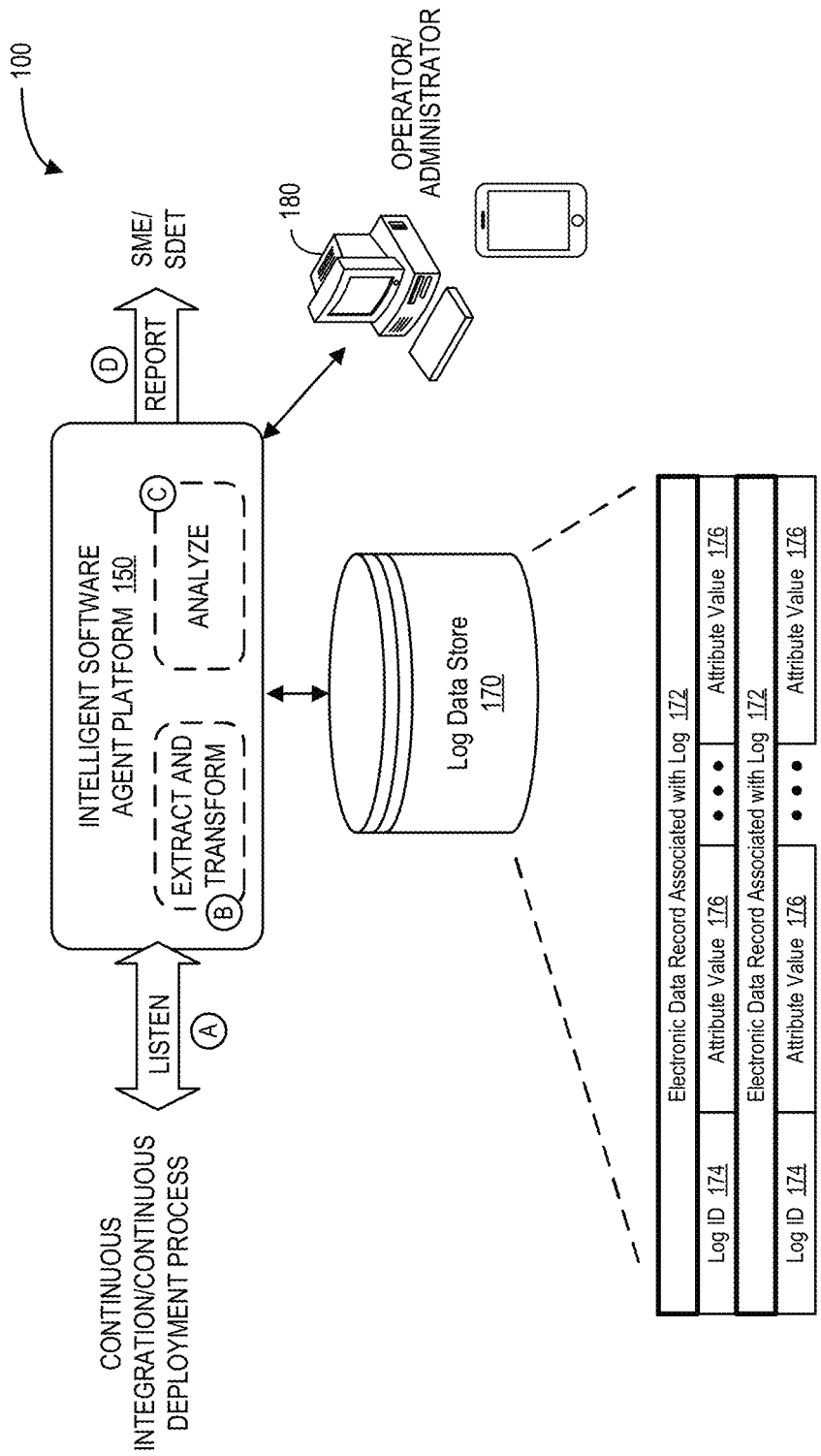
FIG. 1 is a high-level block diagram of a system in accordance with some embodiments.

The present invention provides significant technical improvements to facilitate electronic messaging and dynamic data analysis. The present invention is directed to more than merely a computer implementation of a routine or conventional activity previously known in the industry as it significantly advances the technical efficiency, access and/or accuracy of communications between devices by implementing a specific new method and system as defined herein. The present invention is a specific advancement in the area of electronic document and/or record attribute retrieval and/or analysis by providing benefits in data accuracy, data availability, and data integrity and such advances are not merely a longstanding commercial practice. The present invention provides improvement beyond a mere generic computer implementation as it involves the processing and conversion of significant amounts of data in a new beneficial manner as well as the interaction of a variety of specialized client and/or third-party systems, networks, and subsystems. For example, in the present invention information may be processed, updated, and analyzed via an intelligent software agent platform to accurately improve the exchange of information, thus improving the overall efficiency of the system associated with message storage requirements and/or bandwidth considerations (e.g., streamlining quality assurance in a continuous integration and/or continuous deployment environment). Moreover, embodiments associated with collecting accurate information might further improve business workflows, customer interactions, allocations of resources (e.g., by saving on quality assurance costs), electronic record processing decisions, etc.

An enterprise may develop and deploy software applications. For example, a business might write software applications (and periodic upgrades to those applications) to handle internal workflows, interactions with customers, etc. As part of the software development process, the enterprise may implement quality assurance processes to reduce the likelihood of errors and improve the stability of the software application. For example, the enterprise might manually review software error logs to monitor the quality of software development. Recently, enterprises have begun to combine software development practices and information technology operations (referred to as "DevOps") to shorten the system development lifecycle while still delivering features, fixes, and updates in accordance with business objectives. For example, a DevOps environment might utilize sets of tools that include tools for software coding, building, testing, packaging, releasing, configuring, monitoring, etc.

The DevOps trend includes Continuous Integration ("CI") which may refer to the practice of merging developers' working copies to a shared mainline on a frequent bases (e.g., several times per day or even tens of times per day). Similarly, Continuous Deployment ("CD") or development processes may refer to a software engineering approach in which software functionalities are delivered frequently through automated deployments (or, in some cases, software functionalities are frequently delivered and deemed to be potentially capable of being deployed without actually being deployed).

Manually implementing quality assurance in such an environment can be a time consuming and error-prone task (e.g., a team of experts may face a huge job of reviewing software logs to determine the root causes of an error). To address this issue, FIG. 1 is a high-level block diagram of a system 100 according to some embodiments of the present invention. In particular, the system 100 includes an intelligent software agent platform 150 that may access information in a software log data store 170 (e.g., storing a set of electronic records 172 representing logs, each record including, for example, one or more log identifiers 174, job identifiers, build identifiers, attribute variables 176, error codes, etc.). As used herein, the phrase "intelligent software agent" might refer to a robotic process or "bot" that automatically collects information, analyzes data (e.g., using artificial intelligence), and/or generates reports about the collected information. Note that a software agent might be associated with any of an autonomous agent, a distributed agent, a multi-agent system, a mobile agent, etc.

The intelligent software agent platform 150 may also listen at (A), extract and transform at (B), and perform analysis at (C) in connection with a continuous integration/continuous deployment process to verify, update, and/or utilize the electronic records 172. The intelligent software agent platform 150 may then apply machine learning to create a report at (D) that is transmitted to, for example, a Subject Matter Expert ("SME") and/or a Software Development Engineer in Test ("SDET").

The intelligent software agent platform 150 may also exchange information with a remote operator or administrator device 110 (e.g., via a firewall). According to some embodiments, an interactive graphical user interface platform of the intelligent software agent platform 150 (and, in some cases, third-party data) may facilitate report creation, decisions, predictions, and/or the display of aggregated results via one or more remote administrator displays or portals (e.g., to adjust operation of the system 100). For example, a remote administrator device 180 may receive a summary associated with multiple software pipelines being monitored by the intelligent software agent platform 150. Based on a review of the summary or information from the device 110, the intelligent software agent platform 150 may adjust data in the log data store 170, automatically create or update report document, generate electronic messages or calendar events, etc. Note that the intelligent software agent platform 150 and/or any of the other devices and methods described herein might be associated with a third party, such as company that performs a service for an enterprise.

The intelligent software agent platform 150 and/or the other elements of the system 100 might be, for example, associated with a Personal Computer ("PC"), laptop computer, smartphone, an enterprise server, a server farm, and/or a database or similar storage devices. According to some embodiments, an "automated" intelligent software agent platform 150 (and/or other elements of the system 100) may facilitate updates and utilization of electronic records in the log data store 170 and report generation. As used herein, the term "automated" may refer to, for example, actions that can be performed with little (or no) intervention by a human.

As used herein, devices, including those associated with the intelligent software agent platform 150 and any other device described herein may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The intelligent software agent platform 150 may store information into and/or retrieve information from the log data store 170 which may be locally stored or reside remote from the intelligent software agent platform 150. As will be described further below, the log data store 170 may be used by the intelligent software agent platform 150 to create pipeline health check reports (e.g., in various file formats). Although a single intelligent software agent platform 150 is shown in FIG. 1, any number of such devices may be included. Moreover, various devices described herein might be combined according to embodiments of the present invention. For example, in some embodiments, the intelligent software agent platform 150 and a configuration data store might be co-located and/or may comprise a single apparatus.

In this way, embodiments may provide a seamlessly integrated automated solution that may reduce the manual efforts needed to analyze logs generated in CI/CD processes. Such an approach might provide more visibility, faster action, and/or better control in connection with DevOps software development.

Figure 2:
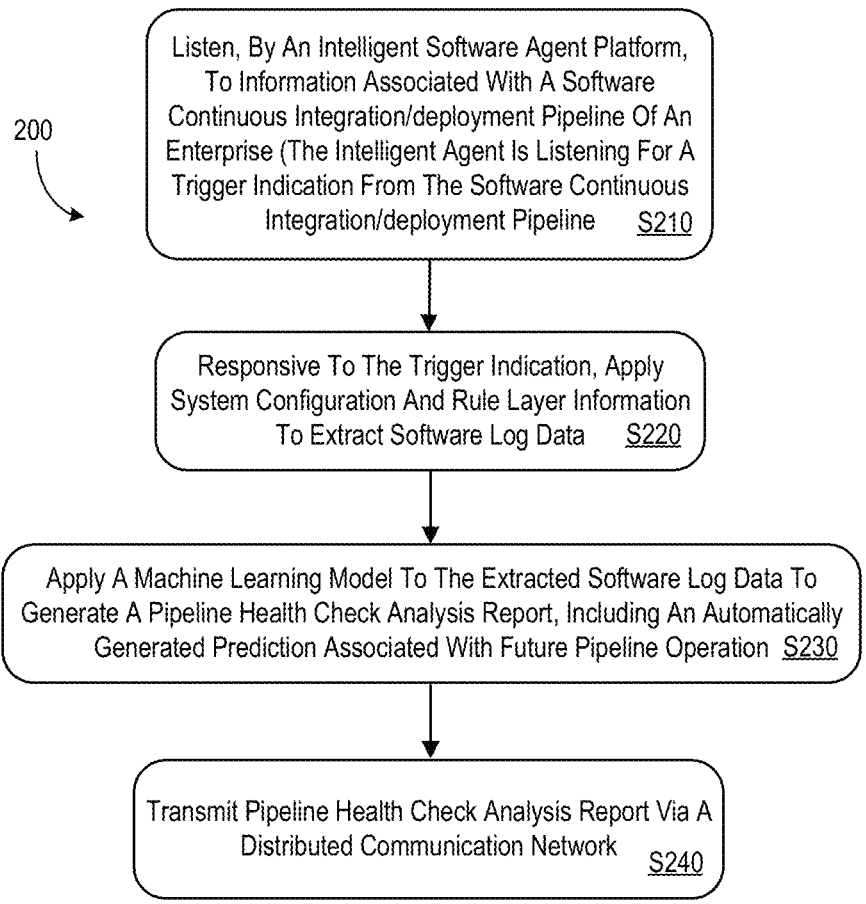
FIG. 2 illustrates a method according to some embodiments of the present invention.

Note that the system 100 of FIG. 1 is provided only as an example, and embodiments may be associated with additional elements or components. According to some embodiments, the elements of the system 100 automatically transmit information associated with an interactive user interface display over a distributed communication network. FIG. 2 illustrates a method 200 that might be performed by some or all of the elements of the system 100 described with respect to FIG. 1, or any other system, according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S210, an intelligent software agent platform listens to information from a communication input port associated with a software continuous integration/deployment pipeline of an enterprise. The software continuous integration/deployment pipeline may include, for example code and build components, static code analysis, deployment, build completion, one or more test triggers, performance measurement components, or any other type of pipeline component. According to some embodiments, the intelligent agent platform is listening for a trigger indication from the software continuous integration/deployment pipeline.

Responsive to the trigger indication, at S220 the intelligent software agent platform may apply system configuration and rule layer information to extract software log data. The system configuration information might include, according to some embodiments, a pipeline configuration, a user configuration, a log properties configuration, etc. Examples of system configuration information might include, for example, stakeholder email addresses, line of business identifiers, jobs to be monitored, a monitoring range, a pipeline stability threshold, a test case failure threshold, quality control login and configuration details, an automatic trigger time, an error classification, application and value stream mapping, multi-environment configuration information, etc.

At S230, the intelligent software agent platform may apply a machine learning model to the extracted software log data to generate a pipeline health check analysis report. The pipeline health check analysis report may include, for example, an automatically generated prediction associated with future operation of the software continuous integration/deployment pipeline. For example, the report might predict a future type of failure or level of stability (e.g., based on current applications or modules that are being modified). According to some embodiments, the generation of the pipeline health check analysis report is performed by a view generator, such as a build level generator, a line of business level generator, and/or an enterprise level generator. As used herein, the phrase "machine learning model" may refer to a process associated with Artificial Intelligence ("AI"), supervised learning, semi-supervised learning, weakly supervised learning, unsupervised learning, reinforcement learning, feature learning, sparse dictionary learning, anomaly detection, decision trees, association rules, an artificial neural network, a Support Vector Machine ("SVM"), a Bayesian network, a genetic algorithm, etc.

At S240, the intelligent software agent may transmit, via a communication output port, the pipeline health check analysis report via a distributed communication network. According to some embodiments, the pipeline health check analysis report is transmitted to an automation framework (e.g., and the report might include a self-healing analysis and/or a recommended corrective action). In other examples, the pipeline health check analysis report may comprise an email message transmitted to a SME, (ii) a SDET, a software manager, a Quality Control ("QC") member, a Quality Assurance ("QA") member, or any other stakeholder. The pipeline health check analysis report may be used, in some embodiments, to automatically transmit a remote access Application Programming Interface ("API") console output to the software continuous integration/deployment pipeline. In some cases, a pipeline health check analysis report may include information about multiple software continuous integration/deployment pipelines and/or at least one recommended action in connection with a detected error (e.g., to facilitate self-healing by taking corrective actions in response to detection of automation failures).

Figure 3:
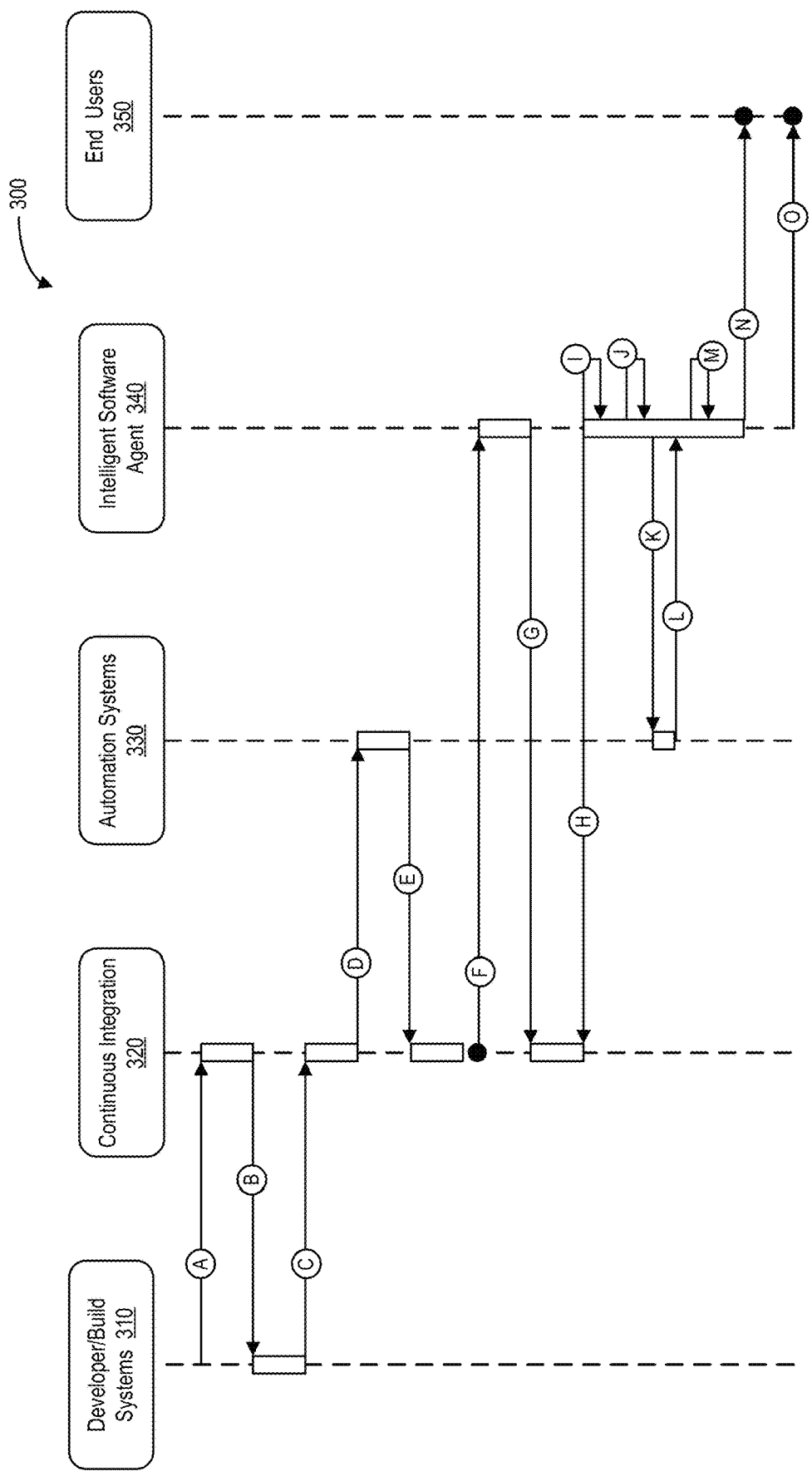
FIG. 3 is an information flow diagram in accordance with some embodiments.

In some embodiments, an intelligent software agent platform may integrate one or more pipeline health check analysis reports into a dashboard display (e.g., accessed via a web-based portal) and/or integrate information to the CI and and CD processes (e.g., exposing interfaces for other solutions to leverage for dashboard, reporting, etc.). In addition to an AI/ML based recommendation engine to provide recommendations for errors, an intelligent software agent platform may utilize an AI/ML based error classifications engine to categorize new errors in pre-defined categories. The agent may also identify error prone source code files and error types to assist a development team in unit testing FIG. 3 is an information flow diagram 300 in accordance with some embodiments. At (A), developer/build systems 310 may transmit a code check-in to continuous integration 320. Continuous integration 320 may then respond with a build trigger at (B) which may cause the developer build systems 310 to indicate that a build was successful at (C). As the continuous integration 320 builds the deployment across environments (e.g., QA and production) at (D), automation systems 330 may provided automated execution and indicate when execution is completed at (E). After the job is completed, automated analysis is triggered at (F) to an intelligent software agent 340. This may cause the intelligent software agent 340 to pull console output at (G) and receive console data at (H). The intelligent software agent 340 performs log extraction at (I) and log storage at (J) before pulling an automation log at (K) and receiving automation lag data at (L). With the automation log, the intelligent software agent 340 may run an insight and recommendation analysis (e.g., using a machine learning process) to create status and recommendation data for a given build that can be transmitted to end users 350 at (N). The intelligent software agent 340 may also generate a daily schedule for a pipeline health check that can be transmitted to end users 350 at (0).

Figure 4:
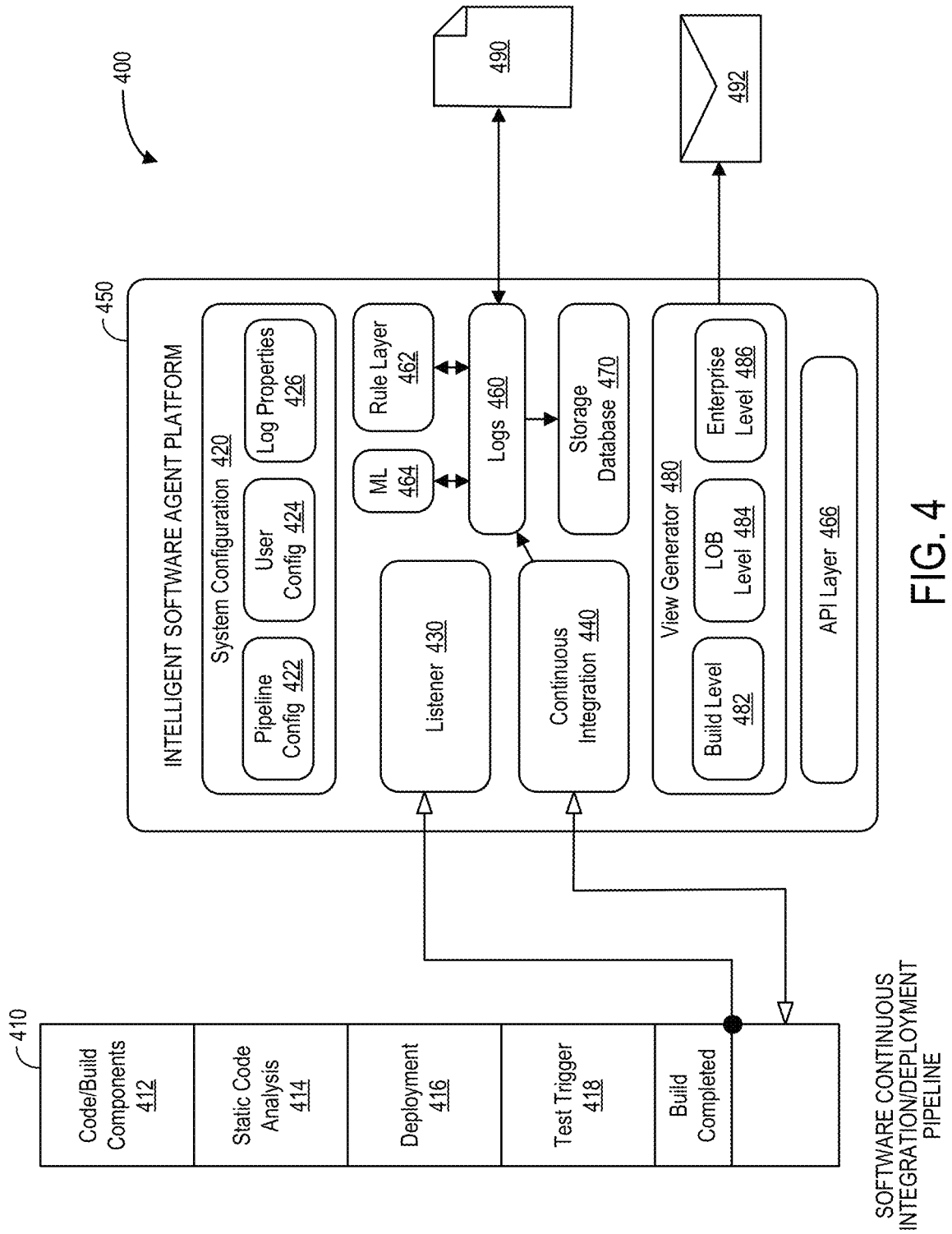
FIG. 4 is a more detailed block diagram of a system according to some embodiments.

FIG. 4 is a more detailed block diagram of a system 400 according to some embodiments. As before, the system 400 includes an intelligent software agent platform 450 that communicates with a software continuous integration/deployment pipeline 410. The pipeline 410 might include, for example, code/build components 412 (e.g., MAVEN and NEXUS), static code analysis 414 (e.g., SONARQUBE), deployment (e.g., UDEPLOY), a test trigger 418 (e.g., associated with an enterprise automation framework), a performance measurement component, or any other type of pipeline 410 component. When the pipeline 410 build is complete, a listener 430 of the intelligent software agent platform may detect that status. System configuration 420 information may include a pipeline configuration 422, a user configuration 424 (e.g., stakeholder email addresses), log properties 426, etc. According to some embodiments, continuous integration 440 may utilze a remote access API to obtain console output from the pipeline 410.

The system configuration 420, a rule layer 462, and Machine Learning ("ML") 464 (e.g., artificial intelligence algorithms or models) may be used to analyze logs 460 stored in a storage database 470. The logs 460 may be provided to an enterprise automation framework (e.g., as failure logs 490) and/or be utilized by a view generator 480. The view generator 480 might, for example, implement a build level 482, a Line Of Business ("LOB") level 484, and/or an enterprise level 486 process to create a pipeline health check analysis report 492 that may be emailed to stakeholders. In this way, the system 400 may seamlessly sit on a DevOps pipeline 410 as an integrated component and automatically get triggered on build completion. The transmitted report 492 may comprise a comprehensive report with actionable insights and the system may monitor incremental builds with a dynamic view range (e.g., viewing daily, weekly, monthly statuses, etc.) and providing an easy way to add applications and/or jobs to the configuration. According to some embodiments, an API layer 466 may further expose the information in the intelligent software agent platform 450 to other components (e.g., that provide a dashboard display, automate self-healing, etc.).

Figure 5:
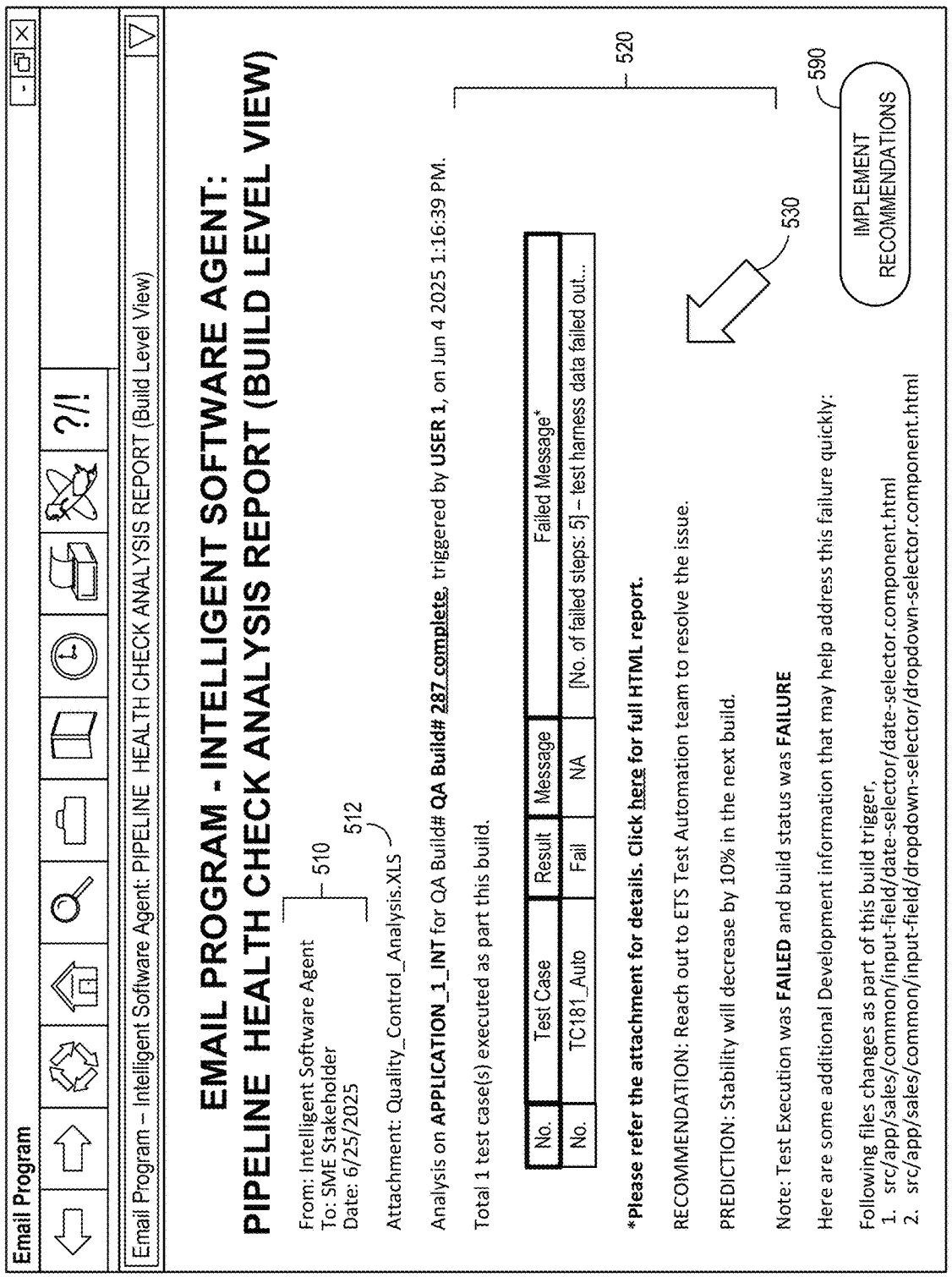
FIG. 5 is a pipeline health check analysis report in accordance with some embodiments.

FIG. 5 is a pipeline health check analysis report 500 (for a build level view) in accordance with some embodiments. The report 500 comprises an email with an email header 510 (e.g., with "from," "to," "date" fields) and an attachment file 512 that contains details about the health of the pipeline. The report 500 also includes an email body 520 containing text, images, tables, etc. that identify the build that was analyzed, summarizes the findings, and, in some embodiments, provides one or more recommendations. Selection of an "Implement Recommendations" icon 590 (e.g., via a touchscreen or computer mouse pointer 530) may cause the system to automatically implement any recommendations. The user may open the attachment file 512 to see more details about the health of the pipeline. For example, FIG. 6 illustrates health check details 600 according to some embodiments. The health check details 600 may include, according to some embodiments, a description, a status (e.g., "passed" or "failed"), an execution date, an execution time, etc. for various errors, trigger events, etc.

Figure 7:
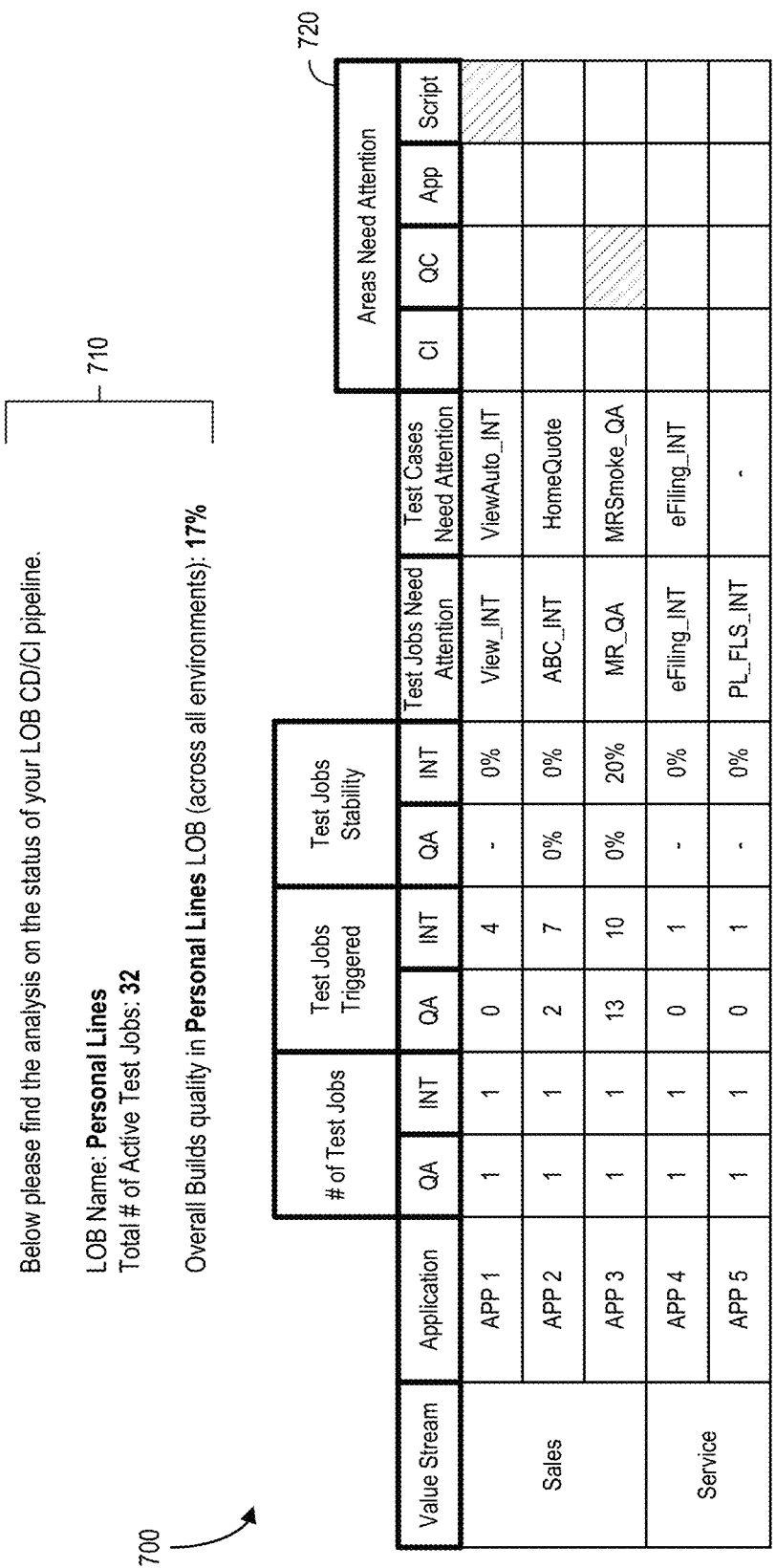
FIG. 7 is a pipeline health check analysis report associated with multiple pipelines in accordance with some embodiments.

FIG. 7 is a pipeline health check analysis report 700 (for a LOB level view) associated with multiple pipelines in accordance with some embodiments. The report 700 might comprise an email, a web page, or any other way of communicating information about the health of multiple pipelines, applications, jobs, etc. The report 700 includes a summary 710 identifying the LOB, the total active test jobs, the overall build quality, etc. The report also includes a table 720 that, for each value stream, identifies an application name, a number of test jobs, jobs trigger, and job stability (e.g., for both a "QA" and "INT" environment), and test jobs/cases that need attention. In the example of FIG. 7, the table also includes a graphical indication of areas that might need further attention (e.g., with cross-hatching identifying areas that a SME should investigate further).

Figure 8:
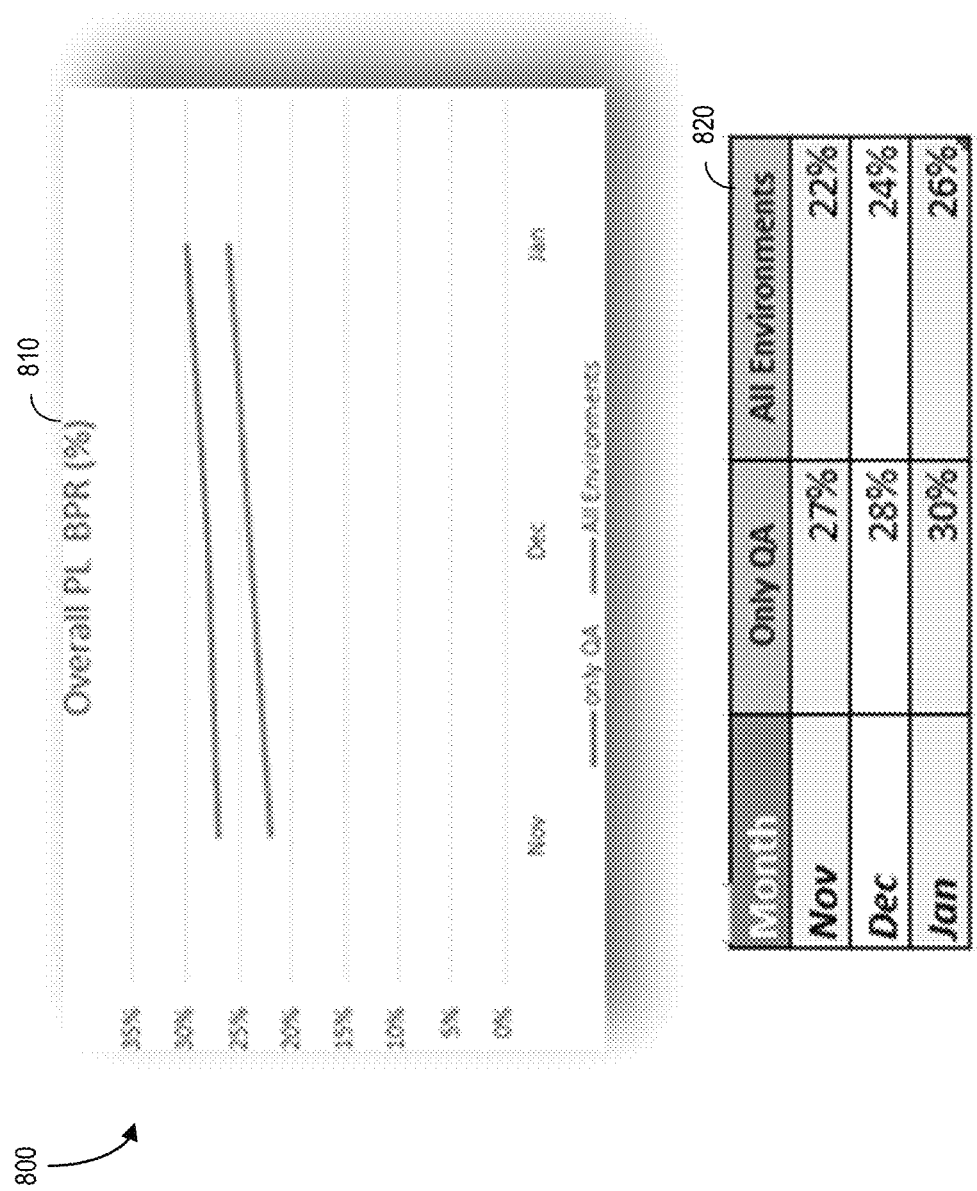
FIG. 8 is a illustrates additional details according to some embodiments.
Figure 9:
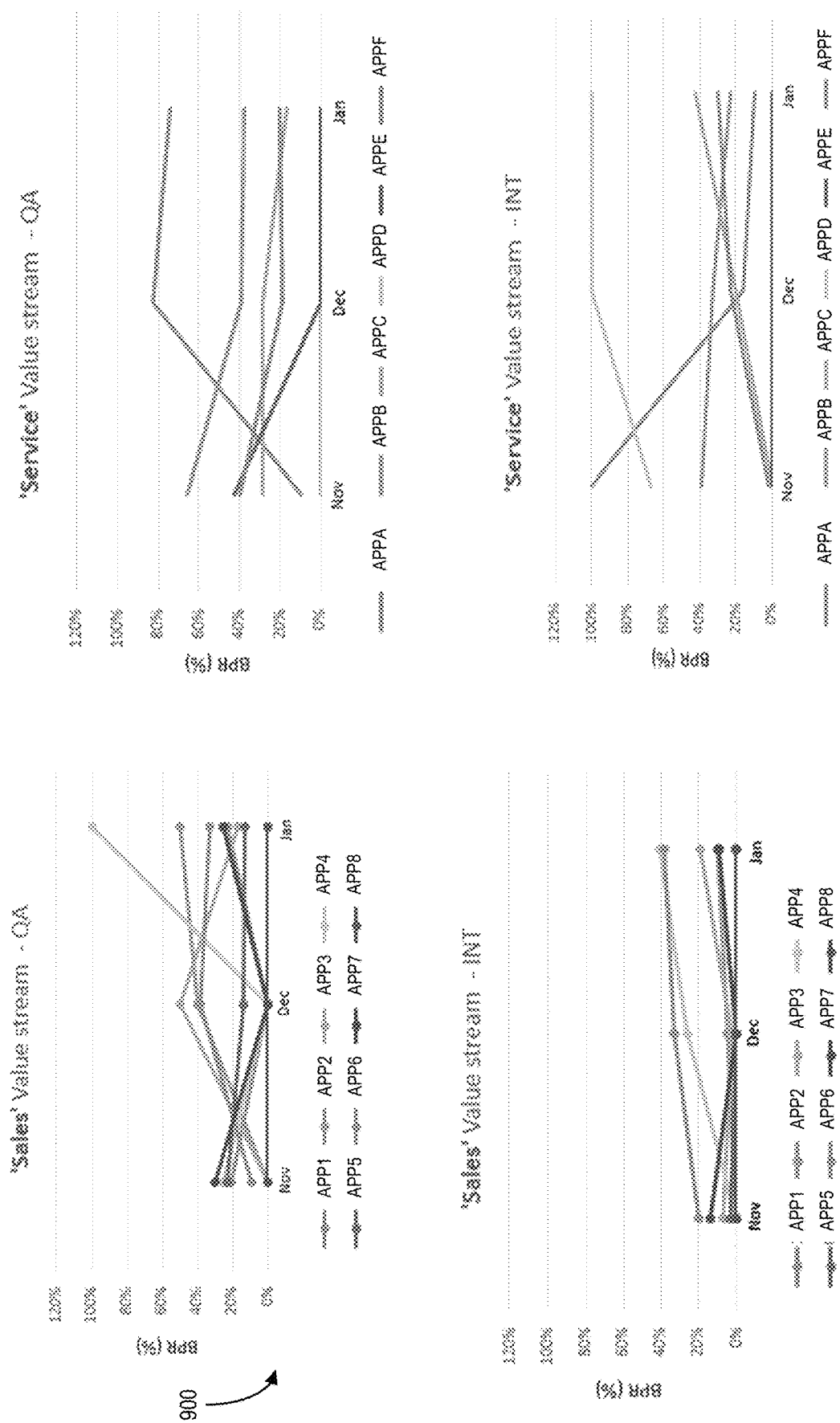
FIG. 9 is a dashboard displaying build pass rate information in accordance with some embodiments.

FIG. 8 is a illustrates additional details 800 that might be included in a report according to some embodiments. For example, a chart 810 might indicate an overall Build Pass Rate ("BPS") percentage for a particular LOB over time. As used herein, the phrase "build pass rate" may refer to a percentage of software builds that have successively passed through a pipeline during a given period of time (e.g., a metric indicative of a system's maturity and/or stability). In this way, a stakeholder can quickly determine if things are improving, getting worse, staying stable, etc. The details 800 might also include a month-by-month breakdown table showing build pass rate percentages in various environments (or combinations of environments). FIG. 9 is a dashboard displaying build pass rate information 900 in accordance with some embodiments. Here, the build pass rates percentages are displayed over time for various value streams and/or environments (e.g., "QA" versus "INT"). Moreover, according to some embodiments, multiple applications may be displayed on the same chart (letting a stakeholder identify a particular application that is experiencing trouble). In addition to (or instead of) providing formation for a dashboard display, embodiments may expose APIs to be leverage by any other system (e.g., an automated self-healing process, a corrective action recommendation process, etc.).

Figure 10:
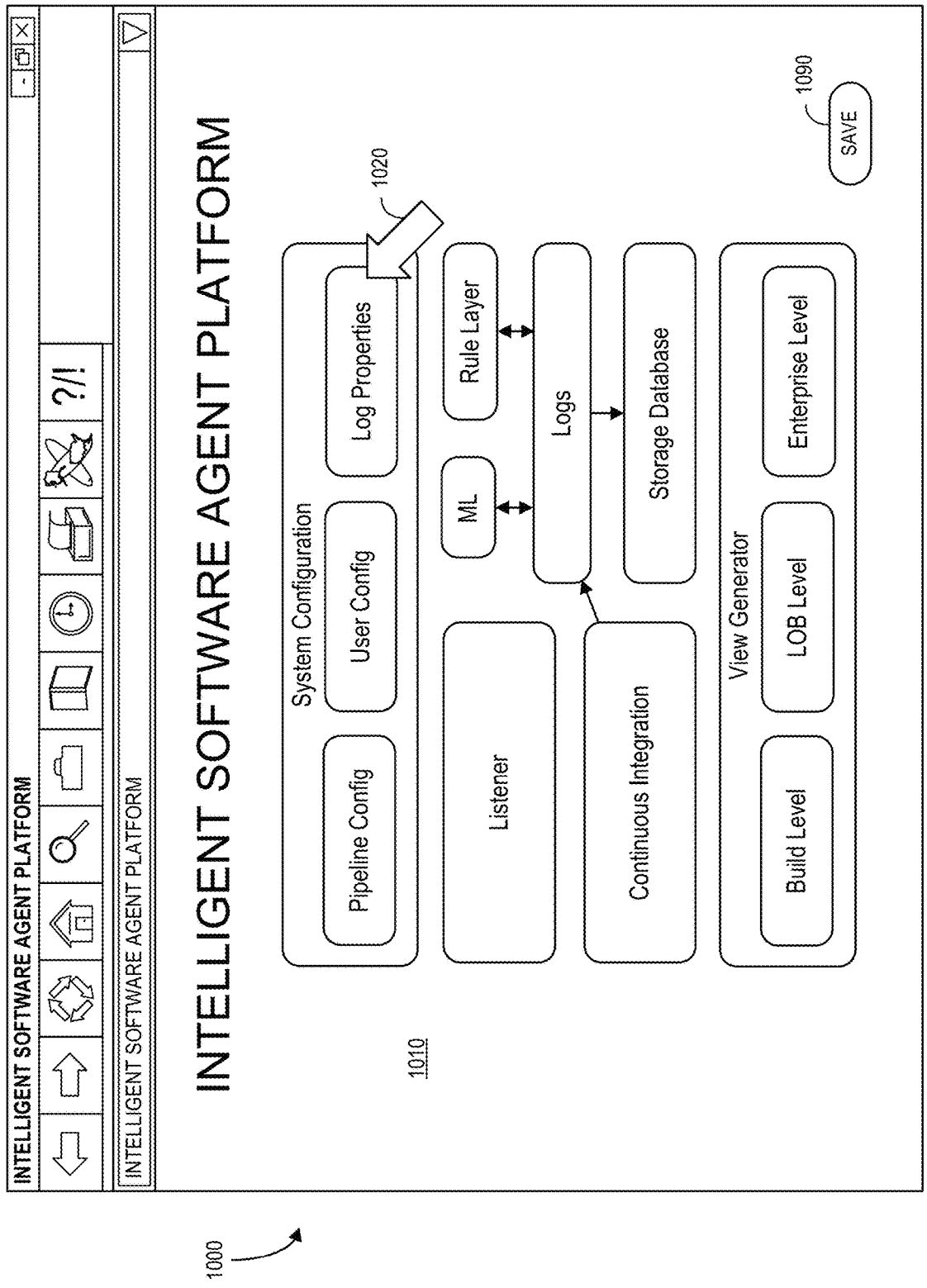
FIG. 10 is an intelligent software agent platform display according to some embodiments.

FIG. 10 is an intelligent software agent platform display 1000 according to some embodiments. The display 1000 includes a graphical representation of an intelligent software agent 1010 (e.g., including system configuration, view generators, etc.) and selection of an element via a touchscreen or computer mouse pointer 1020 may let a user view additional information (e.g., via a pop-up window) and/or adjust information via the display 1000. For example, the user might add additional stakeholder email addresses to a user configuration file. Selection of a "Save" icon 1090 might let the user save any changes that have been made (e.g., new jobs or applications that should be monitored by the intelligent software agent).

Figure 11:
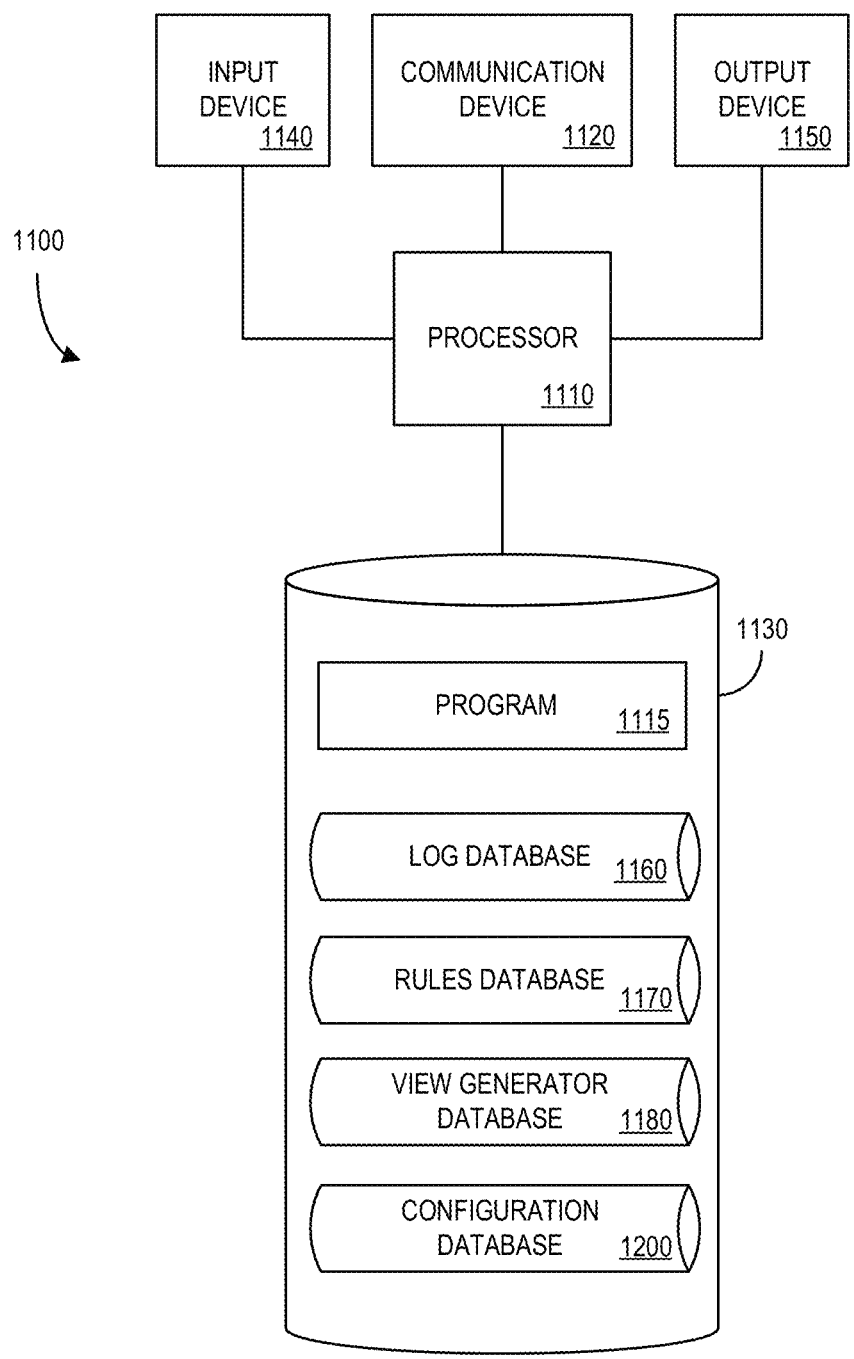
FIG. 11 is a block diagram of an apparatus in accordance with some embodiments of the present invention.

The embodiments described herein may be implemented using any number of different hardware configurations. For example, FIG. 11 illustrates an apparatus 1100 that may be, for example, associated with the systems 100, 400 described with respect to FIGS. 1 and 4, respectively. The apparatus 1100 comprises a processor 1110, such as one or more commercially available Central Processing Units ("CPUs") in the form of one-chip microprocessors, coupled to a communication device 1120 configured to communicate via a communication network (not shown in FIG. 11). The communication device 1120 may be used to communicate, for example, with one or more remote administrator computers and or communication devices (e.g., PCs and smartphones). Note that communications exchanged via the communication device 1120 may utilize security features, such as those between a public internet user and an internal network of the insurance enterprise. The security features might be associated with, for example, web servers, firewalls, and/or PCI infrastructure. The apparatus 1100 further includes an input device 1140 (e.g., a mouse and/or keyboard to enter information about stakeholders, pipelines, etc.) and an output device 1150 (e.g., to output reports regarding pipeline health and/or recommendations).

The processor 1110 also communicates with a storage device 1130. The storage device 1130 may comprise any appropriate information storage device, including combinations of magnetic storage devices (e.g., a hard disk drive), optical storage devices, mobile telephones, and/or semiconductor memory devices. The storage device 1130 stores a program 1115 and/or a risk evaluation tool or application for controlling the processor 1110. The processor 1110 performs instructions of the program 1115, and thereby operates in accordance with any of the embodiments described herein. For example, the processor 1110 may listen for a trigger indication from the software continuous integration/deployment pipeline. Responsive to the trigger indication, the processor 1110 may apply system configuration and rule layer information to extract software log data and apply a machine learning model to the extracted software log data to generate a pipeline health check analysis report. The processor 1110 may then facilitate transmission of the pipeline health check analysis report via a communication output port and a distributed communication network.

The program 1115 may be stored in a compressed, uncompiled and/or encrypted format. The program 1115 may furthermore include other program elements, such as an operating system, a database management system, and/or device drivers used by the processor 1110 to interface with peripheral devices.

As used herein, information may be "received" by or "transmitted" to, for example: (i) the intelligent software agent platform 1100 from another device; or (ii) a software application or module within the intelligent software agent platform 1100 from another software application, module, or any other source.

In some embodiments (such as shown in FIG. 11), the storage device 1130 further stores a log database 1160 (e.g., including error logs extracted from a pipeline), a rules database 1170 (e.g., including machine learning rules about how to analyze information in the log database 1160), a view generator database 1180 (e.g., including email templates and other information that should be included in a pipeline health report) and a configuration database 1200. An example of a database that might be used in connection with the apparatus 1100 will now be described in detail with respect to FIG. 12. Note that the database described herein is only an example, and additional and/or different information may be stored therein. Moreover, various databases might be split or combined in accordance with any of the embodiments described herein. For example, the log database 1160 and rules database 1170 might be combined and/or linked to each other within the program 1115.

Figure 12:
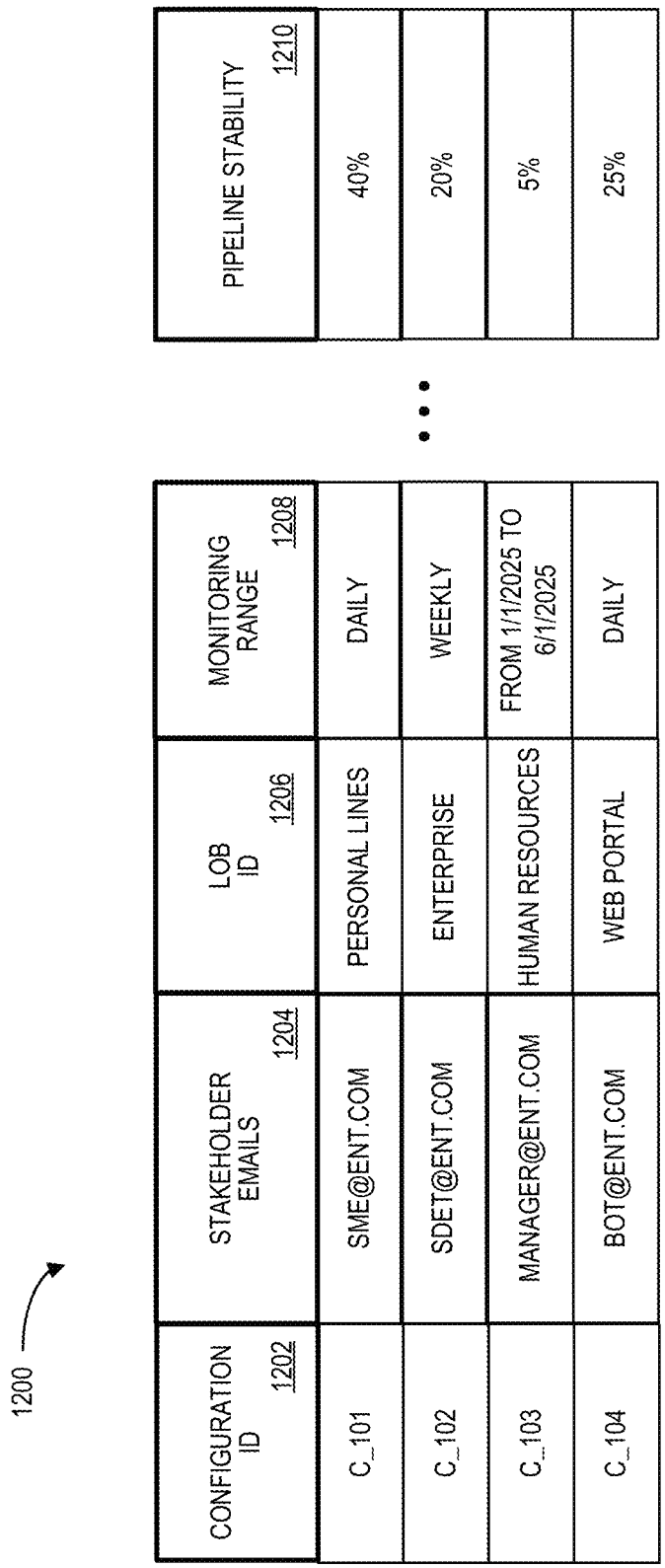
FIG. 12 is a portion of a tabular pipeline health check analysis report database according to some embodiments.

Referring to FIG. 12, a table is shown that represents the configuration database 1200 that may be stored at the apparatus 1100 according to some embodiments. The table may include, for example, entries associated with software error logs. The table may also define fields 1202, 1204, 1206, 1208, 1210 for each of the entries. The fields 1202, 1204, 1206, 1208, 1210 may, according to some embodiments, specify: a configuration identifier 1202, stakeholder emails 1204, a LOB identifier 1206, a monitoring range 1208, and pipeline stability 1210. The configuration database 1200 may be created and updated, for example, based on information received from a SME, a SDET, a manager, etc.

The configuration identifier 1202 may be, for example, a unique alphanumeric code identifying a bot that listens to information from a pipeline and, when an event is detected, uses a machine learning process to automatically create a distribute a health report about the pipeline. The stakeholder emails 1204 may represent the email addresses of those parties that should receive the health report (including, if applicable, other automated systems including the pipeline itself). The LOB identifier 1206 indicates a particular line of business (e.g., enterprise unit, organization, product, etc.) associated with the configuration identifier 1202 (allowing for the aggregation of information from multiple agents and/or pipelines). The monitoring range 1208 might define a report frequency (e.g., daily or weekly), range of applicable dates, etc. The pipeline stability 1210 might represent a threshold value that triggers an alert, adjust the display of data (e.g., by presenting the information as red text to provide a warning).

Figure 13:
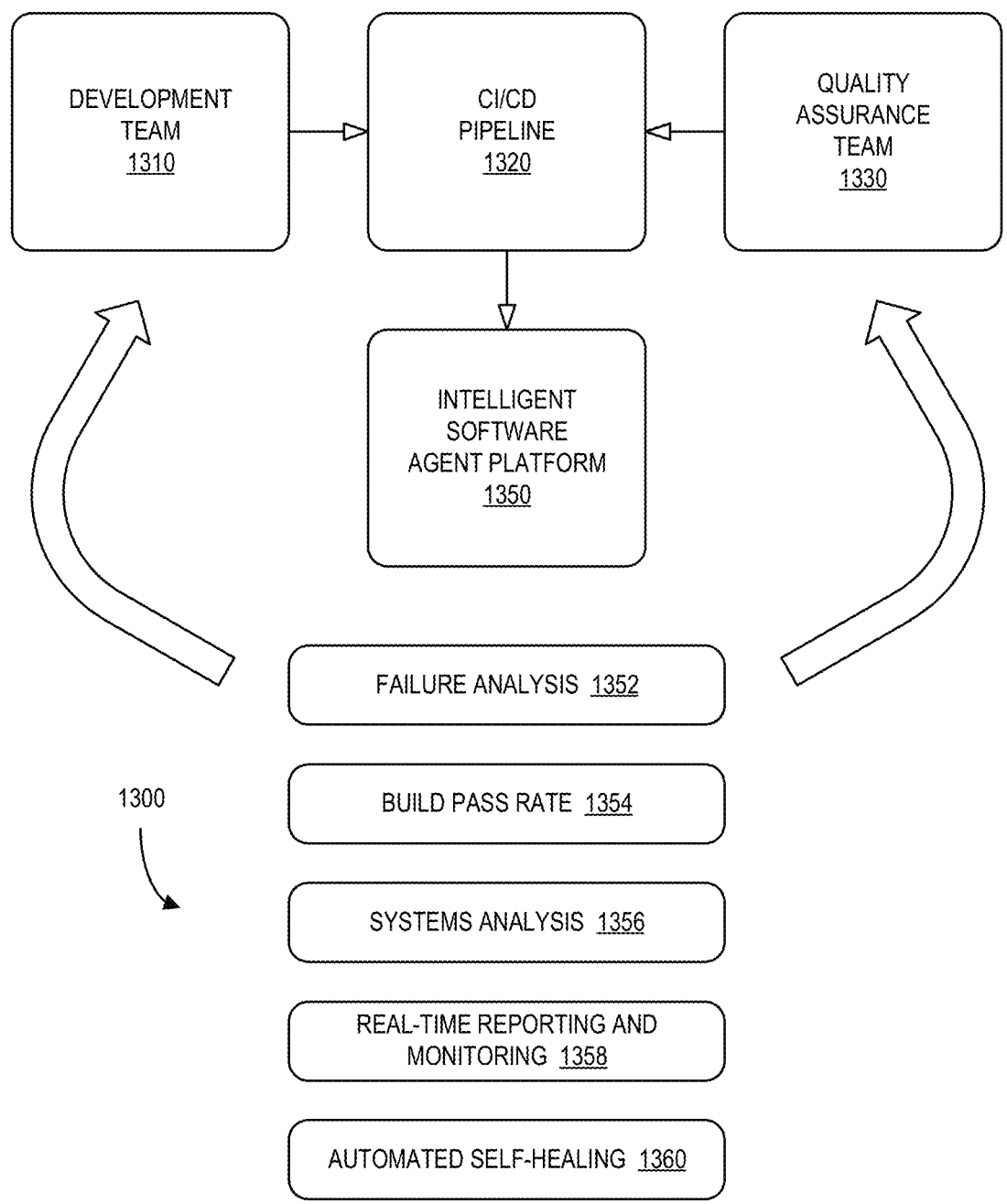
FIG. 13 illustrates intelligent software agent and quality assurance synergy in accordance with some embodiments.

FIG. 13 illustrates intelligent software agent and quality assurance synergy 1300 in accordance with some embodiments. A CI/CD pipeline 1320 receives information from both a development team 1310 (e.g., application code changes, builds, and deployments) and a quality assurance team 1330 (e.g., automation script framework setup and test results). An intelligent software agent platform 1350 listens to information from the CI/CD pipeline 1350 performs a number of functions, such as failure analysis 1352, build pass rate calculation 1354, system analysis 1356, real-time reporting and monitoring 1358, automated self-healing 1360, etc. Information associated with these functions may then be used to provide updates to the development team 1310. For example, the development team 1310 and quality assurance team 1330 might synchronize on every build, code changes can be highlighted with DevOps build failures, the development team 1310 may derive insights based on patterns, such as application source code and build failures, developer and build failures, etc. Information associated with the intelligent software agent platform 1350 functions may then be used to provide updates to the quality assurance team 1330. For example, information about points of failure, recommendations and corrective actions, analytics for prioritization, DevOps build maturity monitoring and control, self-healing (to reduce rectification effort), etc. In this way, the system may provide sustained CI/CD build maturity, process improvements based on build patterns, provided faster resolution for build failures, and provide awareness for end-to-end build process monitoring. Although FIG. 13 illustrates synergy between a development team 1310 and a quality assurance team 1330, note that embodiments may also help any other stakeholders leverage solutions that help optimize software development quality.

Thus, embodiments may provide an increase in automated executions resulting from DevOps (e.g., on an average 2 or 3 builds might get deployed per application), reduce manual effort spent in log analysis and triaging (using automation to reduce SME effort spent on log analysis), solve the lack of monitoring controls on pipeline status (giving leaders and managers insight about pipeline/job status), etc.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 14:
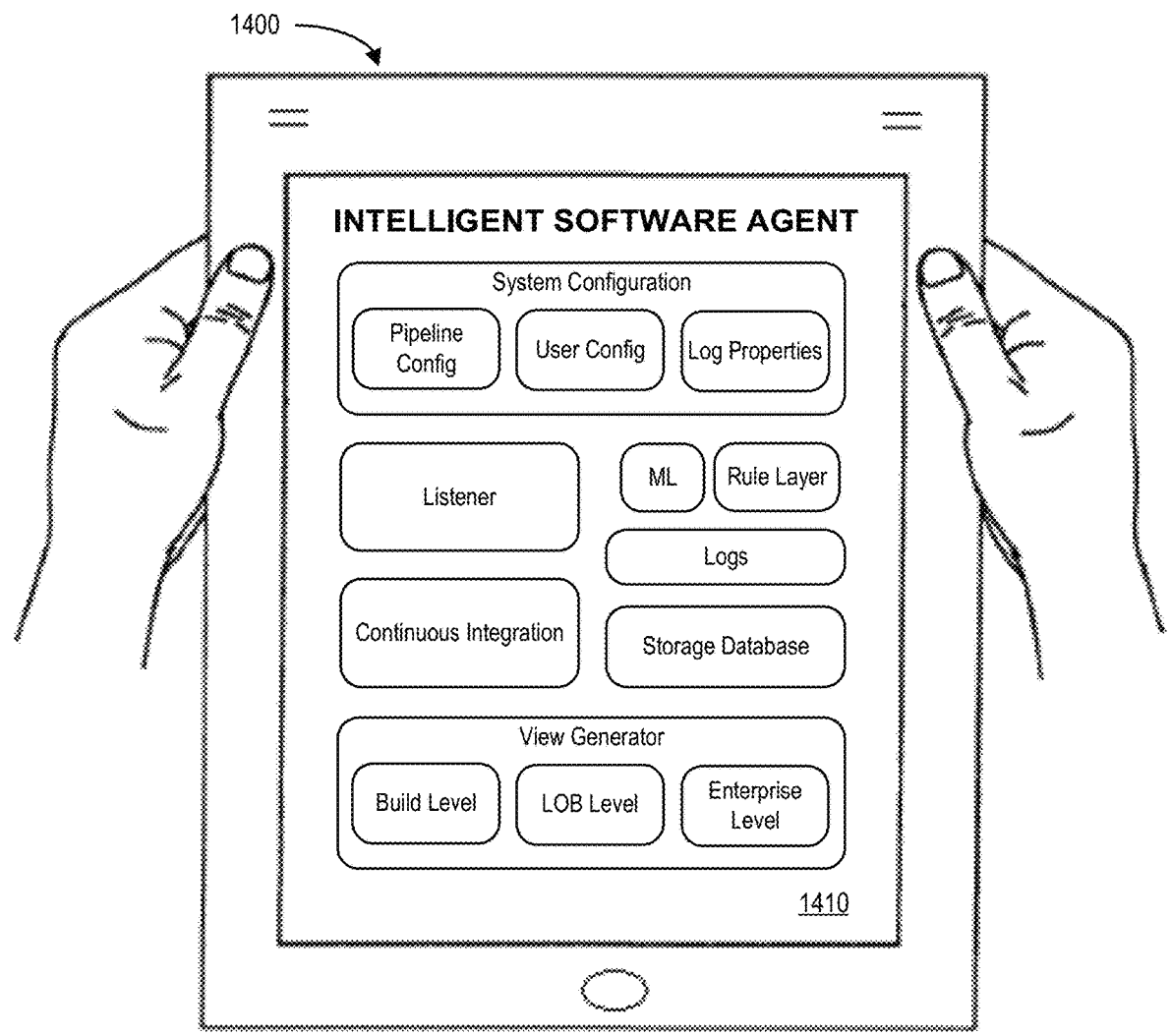
FIG. 14 illustrates a tablet computer displaying an information sharing user interface according to some embodiments.

Although specific hardware and data configurations have been described herein, note that any number of other configurations may be provided in accordance with embodiments of the present invention (e.g., some of the information associated with the displays described herein might be implemented as a virtual or augmented reality display and/or the databases described herein may be combined or stored in external systems). Moreover, although embodiments have been described with respect to particular types of enterprise applications, embodiments may instead be associated with other types of applications in additional to and/or instead of the ones described herein (e.g., financial applications, medical applications, manufacturing applications, etc.). Similarly, although certain attributes were described in connection some embodiments herein, other types of attributes might be used instead. Still further, the displays and devices illustrated herein are only provided as examples, and embodiments may be associated with any other types of user interfaces. For example, FIG. 14 illustrates a handheld tablet computer 1400 showing an intelligent software agent display 1410 according to some embodiments. The intelligent software agent display 1410 might include user-selectable data that can be selected and/or modified by a user of the handheld computer 1400 to provide updated pipeline information associated with an enterprise (e.g., via selection of graphical elements on the display 1410 via touchscreen, entry of search terms, and/or activation of a "Search" icon, etc.).

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed:

1. A system to facilitate software development and operations for an enterprise, comprising:
   (a) a communication input port to receive information associated with a software continuous integration and/or deployment pipeline of the enterprise;
   (b) an intelligent software agent platform, coupled to the communication input port, including a computer processor and a memory storing instructions to cause the computer processor to:
      (i) listen for a trigger indication from the software continuous integration and/or deployment pipeline,
      (ii) responsive to the trigger indication, apply system configuration information and rule layer information to extract software log data, and
      (iii) apply a machine learning model to the extracted software log data to generate a pipeline health check analysis report, wherein the pipeline health check analysis report includes an automatically generated prediction associated with future operation of the software continuous integration and/or deployment pipeline and the pipeline health check analysis report is used to automatically transmit a remote access Application Programming Interface ("API") console output to the software continuous integration and/or deployment pipeline; and
   (c) a communication output port coupled to the intelligent software agent platform to facilitate transmission of the pipeline health check analysis report via a distributed communication network;
   wherein the pipeline health check analysis report includes:
      a prediction of a level of stability of the software continuous integration and/or deployment pipeline;
      a percentage of software builds that have successively passed through the software continuous integration and/or deployment pipeline during a time period;
      a prediction of a future type of failure of the software continuous integration and/or deployment pipeline;
      a number of test jobs associated with an application program; and
      information about multiple software continuous integration and/or deployment pipelines; and
   wherein the pipeline health check analysis report comprises an email message transmitted to at least one of: (i) a subject matter expert, (ii) a software development engineer in test, (iii) a software manager, (iv) a quality control member, (v) a quality assurance member, or (vi) any other stakeholder.

2. The system of claim 1, wherein the machine learning model is associated with a knowledge map of the software continuous integration and/or deployment pipeline that classifies errors in the software log data.

3. The system of claim 1, wherein the software continuous integration and/or deployment pipeline includes at least one of: (i) code and build components, (ii) static code analysis, (iii) deployment, (iv) build completion, (iv) a test trigger, (v) a performance measurement component, and (vi) any of pipeline component.

4. The system of claim 1, wherein the system configuration information includes at least one of: (i) a pipeline configuration, (ii) a user configuration, and (iii) a log properties configuration.

5. The system of claim 4, wherein the system configuration information includes at least one of: (i) stakeholder email addresses, (ii) line of business identifiers, (iii) jobs to be monitored, (iv) a monitoring range, (v) a pipeline stability threshold, (vi) a test case failure threshold, (vii) quality control login and configuration details, (viii) an automatic trigger time, (ix) an error classification, (x) application and value stream mapping, and (xi) multi-environment configuration information.

6. The system of claim 1, wherein the generation of the pipeline health check analysis report is performed by a view generator including at least one of: (i) a build level generator, (ii) a line of business level generator, and (iii) an enterprise level generator.

7. The system of claim 1, wherein the pipeline health check analysis report is transmitted to an automation framework and includes at least one of a self-healing analysis and a recommended corrective action.

8. The system of claim 1, wherein the pipeline health check analysis report includes at least one recommended action.

9. The system of claim 1, wherein the intelligent software agent platform is further to integrate the pipeline health check analysis report into a dashboard display.

10. The system of claim 1, wherein the machine learning model is associated with at least one of: (i) artificial intelligence, (ii) supervised learning, (iii) semi-supervised learning, (iv) weakly supervised learning, (v) unsupervised learning, (vi) reinforcement learning, (vii) feature learning, (viii) sparse dictionary learning, (ix) anomaly detection, (x) decision trees, (xi) association rules, (xii) an artificial neural network, (xiii) a support vector machine, (xiv) a Bayesian network, and (xv) a genetic algorithm.

11. A computerized method to facilitate software development and operations for an enterprise, comprising:
   listening, by an intelligent software agent platform, to information from a communication input port associated with a software continuous integration and/or deployment pipeline of the enterprise, wherein the intelligent software agent platform is listening for a trigger indication from the software continuous integration and/or deployment pipeline;
responsive to the trigger indication, applying system configuration information and rule layer information to extract software log data;
applying a machine learning model to the extracted software log data to generate a pipeline health check analysis report, wherein the pipeline health check analysis report includes an automatically generated prediction associated with future operation of the software continuous integration and/or deployment pipeline and the pipeline health check analysis report is used to automatically transmit a remote access Application Programming Interface ("API") console output to the software continuous integration and/or deployment pipeline; and
transmitting, via a communication output port coupled to the intelligent software agent platform, the pipeline health check analysis report via a distributed communication network; wherein the pipeline health check analysis report includes:
a prediction of a level of stability of the software continuous integration and/or deployment pipeline;
a percentage of software builds that have successively passed through the software continuous integration and/or deployment pipeline during a time period;
a prediction of future type of failure of the software continuous integration and/or deployment pipeline;
a number of test jobs associated with an application program; and
information about multiple software continuous integration and/or deployment pipelines; and
wherein the pipeline health check analysis report comprises an email message transmitted to at least one of: (i) a subject matter expert, (ii) a software development engineer in test, (iii) a software manager, (iv) a quality control member, (v) a quality assurance member, or (vi) any other stakeholder.

12. The method of claim 11, wherein the software continuous integration and/or deployment pipeline includes at least one of: (i) code and build components, (ii) static code analysis, (iii) deployment, (iv) build completion, (iv) a test trigger, (v) a performance measurement component, and (vi) any other type of pipeline component.

13. The method of claim 11, wherein the system configuration information includes at least one of: (i) a pipeline configuration, (ii) a user configuration, and (iii) a log properties configuration.

14. The method of claim 11, wherein the generation of the pipeline health check analysis report is performed by a view generator including at least one of: (i) a build level generator, (ii) a line of business level generator, and (iii) an enterprise level generator.

15. A non-transitory, computer-readable medium storing instructions, that, when executed by a processor, cause the processor to perform a method to facilitate software development and operations for an enterprise, the method comprising:
listening, by an intelligent software agent platform, to information from a communication input port associated with a software continuous integration and/or deployment pipeline of the enterprise, wherein the intelligent software agent platform is listening for a trigger indication from the software continuous integration and/or deployment pipeline;
responsive to the trigger indication, applying system configuration information and rule layer information to extract software log data;
applying a machine learning model to the extracted software log data to generate a pipeline health check analysis report, wherein the pipeline health check analysis report includes an automatically generated prediction associated with future operation of the software continuous integration and/or deployment pipeline and the pipeline health check analysis report is used to automatically transmit a remote access Application Programming Interface ("API") console output to the software continuous integration and/or deployment pipeline; and
transmitting, via a communication output port coupled to the intelligent software agent platform, the pipeline health check analysis report via a distributed communication network; wherein the pipeline health check analysis report includes:
a prediction of a level of stability of the software continuous integration and/or deployment pipeline;
a percentage of software builds that have successively passed through the software continuous integration and/or deployment pipeline during a time period;
a prediction of a future type of failure of the software continuous integration and/or deployment pipeline;
a number of test jobs associated with an application program; and
information about multiple software continuous integration and/or deployment pipelines; and
wherein the pipeline health check analysis report comprises an email message transmitted to at least one of: (i) a subject matter expert, (ii) a software development engineer in test, (iii) a software manager, (iv) a quality control member, (v) a quality assurance member, or (vi) any other stakeholder.

16. The medium of claim 15, wherein the pipeline health check analysis report is transmitted to an automation framework and includes at least one of a self-healing analysis and a recommended corrective action.

17. The medium of claim 15, wherein the pipeline health check analysis report includes at least one recommended action.

18. The medium of claim 15, wherein the intelligent software agent platform is further to integrate the pipeline health check analysis report into a dashboard display.

19. The medium of claim 15, wherein the machine learning model is associated with at least one of: (i) artificial intelligence, (ii) supervised learning, (iii) semi-supervised learning, (iv) weakly supervised learning, (v) unsupervised learning, (vi) reinforcement learning, (vii) feature learning, (viii) sparse dictionary learning, (ix) anomaly detection, (x) decision trees, (xi) association rules, (xii) an artificial neural network, (xiii) a support vector machine, (xiv) a Bayesian network, and (xv) a genetic algorithm.

* * * * *